United States Patent [19]

Naruse et al.

[11] 3,908,117
[45] Sept. 23, 1975

[54] METHOD AND APPARATUS FOR MONITORING AND DIAGNOSING TROUBLES IN SEQUENTIAL CONTROL OPERATIONS

[75] Inventors: Katutoshi Naruse; Kazuhiko Hasegawa, both of Toyota; Kazuo Matsuno, Gifu; Toshikiko Yomogida, Chiryu; Hideyuki Sanpe, Nagoya, all of Japan

[73] Assignee: Toyoda Koki Kabushiki Kaisha, Japan

[22] Filed: Feb. 11, 1974

[21] Appl. No.: 441,068

[30] Foreign Application Priority Data
Feb. 21, 1973  Japan.............................. 48-21037

[52] U.S. Cl.................... 235/153 AK; 444/1; 408/8
[51] Int. Cl.²......................................... G06F 11/04
[58] Field of Search.................. 235/153 AK, 153 A

[56] References Cited
UNITED STATES PATENTS
3,599,179   8/1971   Arnold....................... 235/153 AK

*Primary Examiner*—Eugene G. Botz
*Attorney, Agent, or Firm*—Oblon, Fisher, Spivak, McClelland & Maier

[57] ABSTRACT

A method and apparatus for monitoring and diagnosing troubles in sequential control operations. Cycle memorizing means respectively memorizes performed sequence cycles, and a timer is energized simultaneously with the start of the sequence cycles and is de-energized at the completion of the completed sequence cycles. The setting time of the timer is slightly longer than the time required to complete the completed sequence cycles and therefore, a diagnosis operation is performed in consideration of the memory in the cycle memory means when the timer times-out.

6 Claims, 6 Drawing Figures

METHOD AND APPARATUS FOR MONITORING AND DIAGNOSING TROUBLES IN SEQUENTIAL CONTROL OPERATIONS

BACKGROUND OF THE INVENTION

1. Field of the Invention

The present invention relates generally to a method and apparatus for monitoring and diagnosing troubles in automatic sequential control operations.

2. Description of the Prior Art

In general, sequential control operations in automatically controlled machines, for example, automatic machine tools are usually very complex and thus, sequential control circuits associated therewith are very intricate. Thus, in the past, even a man skilled in operating the machine had difficulty in finding the portion of the machine troubled and the cause thereof when the machine suddenly stopped by an occurrence of an abnormal condition. Accordingly, a substantial period of time was usually needed to check each machine portion in detail which could be considered as potentially the cause of the trouble and then to renew or repair the troubled part or parts. There was, therefore, a disadvantage in the prior technology that the machine stopped for a long time when a trouble occured and accordingly, machine down time was increased and the rate of operation of the machine was greatly decreased.

SUMMARY OF THE INVENTION

Accordingly, it is one object of the present invention to provide new, improved and unique method and apparatus for automatically and rapidly monitoring and diagnosing troubles in sequential control operations in order to easily repair the troubled portion and to prevent the decreasing of the rate of operation of the machine due to increased down time.

For foregoing and other objects of the present invention are attained in accordance with one aspect of the present invention through a provision of a novel method and apparatus for monitoring and diagnosing troubles occuring in a sequential control operation comprising memorizing the progression of a predetermined machine sequence operation having at least one unit sequence cycle whenever each unit sequence cycle is performed; determining whether or not the predetermined machine sequence operation is completed within a predetermined time, searching a progressing end of the unit sequence cycle if the predetermined machine sequence operation has not been completed within the predetermined time, generating an abnormality signal indicating the progressing end; and executing diagnosis programs selected in response to the abnormality signal for diagnosing machine portions suspected to be troubled and indicating causes thereof.

BRIEF DESCRIPTION OF THE DRAWINGS

Various other objects features and attendant advantages of the present invention will be more fully appreciated as the same becomes better understood from the following detailed description of a preferred embodiment of the present invention when considered in connection with the accompanying drawings in which.

DETAILED DESCRIPTION OF A PREFERRED EMBODIMENT

Figure 1:
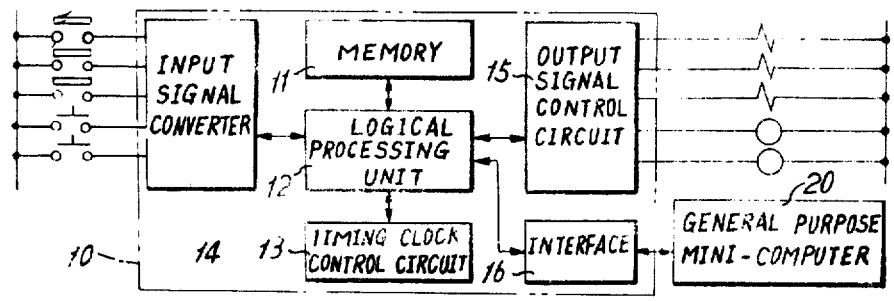
FIG. 1 shows a block diagram of a general purpose sequence controller for automatically controlling machine tools in cooperation with a general purpose mini-computer.
Figure 2:
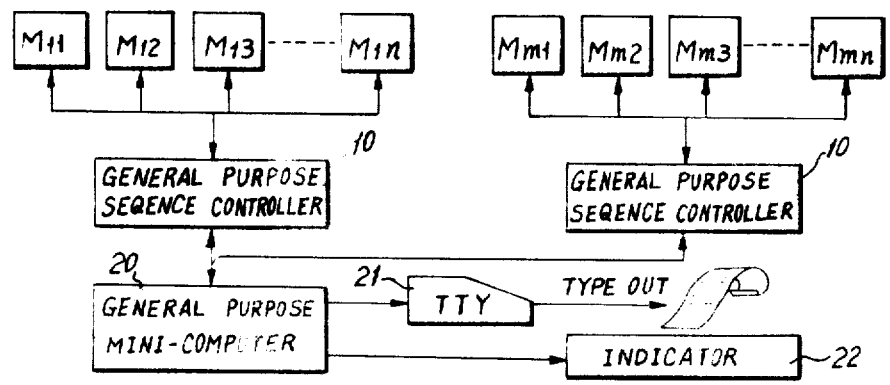
FIG. 2 shows a block diagram of a diagnosing and monitoring system.

Referring now to the drawings, wherein like reference numerals designate identical or corresponding parts throughout the several views, and more particularly to FIG. 1 thereof, a general purpose sequence controller 10 comprises a memory 11, a logical processing unit 12, a timing clock control circuit 13, an input signal converter 14, an output signal control circuit 15, and an interface 16 for transmitting data between the sequence controller 10 and a general purpose mini-computer 20. The memory 11 stores a series of instructions relating to sequential operations. These instructions comprise test commands of the input signals, for example, whether or not an indicated limit switch is "ON," and output commands in cooperation with the result of the test commands. The test and output command instructions are given along with device codes of the input and output control devices such as limit switches and relays. The input signal converter 14 is connected with control devices such as the limit switches, push button switches, change-over switches, etc. and serves to convert the input signals of high voltage therefrom into signals of low voltage which are available in the processing unit 12. An output signal control circuit 15 is connected with the output control devices such as power relays, power solenoids, etc., which serve to actuate the actuating members of the machine. Furthermore, the output signal control circuit 15 is provided with a dummy card which has a plurality of dummy flags, a latch card which has a series of latch relays, and a timer card having a plurality of I.C. timers, all of which are not connected with the outer control devices and are respectively able to be energized and/or de-energized in response to the output instructions and which also are respectively testable, the input conditions being the test instructions along with the conditions of the above output control device. The test instructions and the output instructions are read out from the memory 11 and are executed in accordance with the predetermined cycle made by control pulse signals generated from the timing clock control circuit 13. In this case, it is determined whether or not the indicated input signals satisfy or coincide with the programmed condition, and according to the result of the determination the conditions of the output control devices selected by the device codes are controlled by the output instructions. As above mentioned, for the conventional relay sequential circuits, it is possible to perform any variety of sequence controls in accordance with a memorization of programs instructing the series of sequential operations in the memory 11 and is also possible to easily change the sequence cycles. Thus, in accordance with the above described sequence controller, it is possible to perform sequential operations with a wide range and to control a plurality of machines if the capacity of memory 11 is large enough. FIG. 2 shows the foregoing system in which the troubles of a plurality of machines controlled by the sequence controllers 10 are monitored and diagnosed. The input and output control circuits 14, 15 of the controllers 10 are connected with several input and output control devices of a plurality of machine tools M11... M1n and Mm1... Mmn. In addition, the program sequence controllers 10 are connected with a general purpose of mini-computer 20 through the interface 16, and are able to generate a program interrupt command RQI to the computer 20 when the later noted troubles in the machine cycle occur, and then, the trouble diagnosing data are transferred from the computer 20 to the sequence controllers 10 through the interface 16 for detecting the troubled portion and the cause thereof, and displaying the same on an indicator 22 and a teletypewriter 21. Thus, the troubled portion or portions supposed to be troubled can be reported to the operator.

Hereinafter, the details of the preferred embodiment are described. For detecting the trouble and generating the program interrupt signal or command RQI for a diagnosis of the trouble toward the computer 20, a series of programs having the following functions must be stored in the memory 11 in addition to the programmed sequence control information.

For detecting a trouble in the machine cycles, it is assumed that the trouble has occurred in a case where the predetermined complete cycles have not been completed after an expiration of a nominal time T1 which is needed to normally perform the predetermined complete cycles. Therefore, a timer on the timer card provided in the output control circuit 15 is energized and an initial cycle of the predetermined cycles is started, and is de-energized when the predetermined complete cycles have completed. A setting time T2 of the timer is slightly longer by a predetermined amount than the nominal time T1 required to perform the predetermined complete cycles. Moreover, the proceeding condition of the cycles is memorized in the cycle memorizing means, which is respectively actuated by a completion or a start of each unit cycle respectively performed in the predetermined sequence. In accordance with this operation, it is possible to detect the cycle number of the troubled cycle based upon the memory of the cycle memorizing means when the timer times out. The cycle number of the troubled cycle is reported to the computer 20, which serves to search the troubled machine portion and cause of the trouble in accordance with a corresponding diagnosis program.

Figure 4:
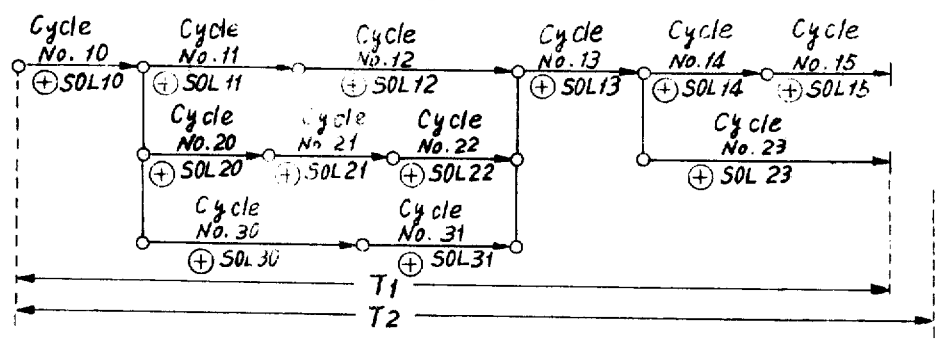
FIG. 4 shows an example of operation cycles of a machine.
Figure 3:
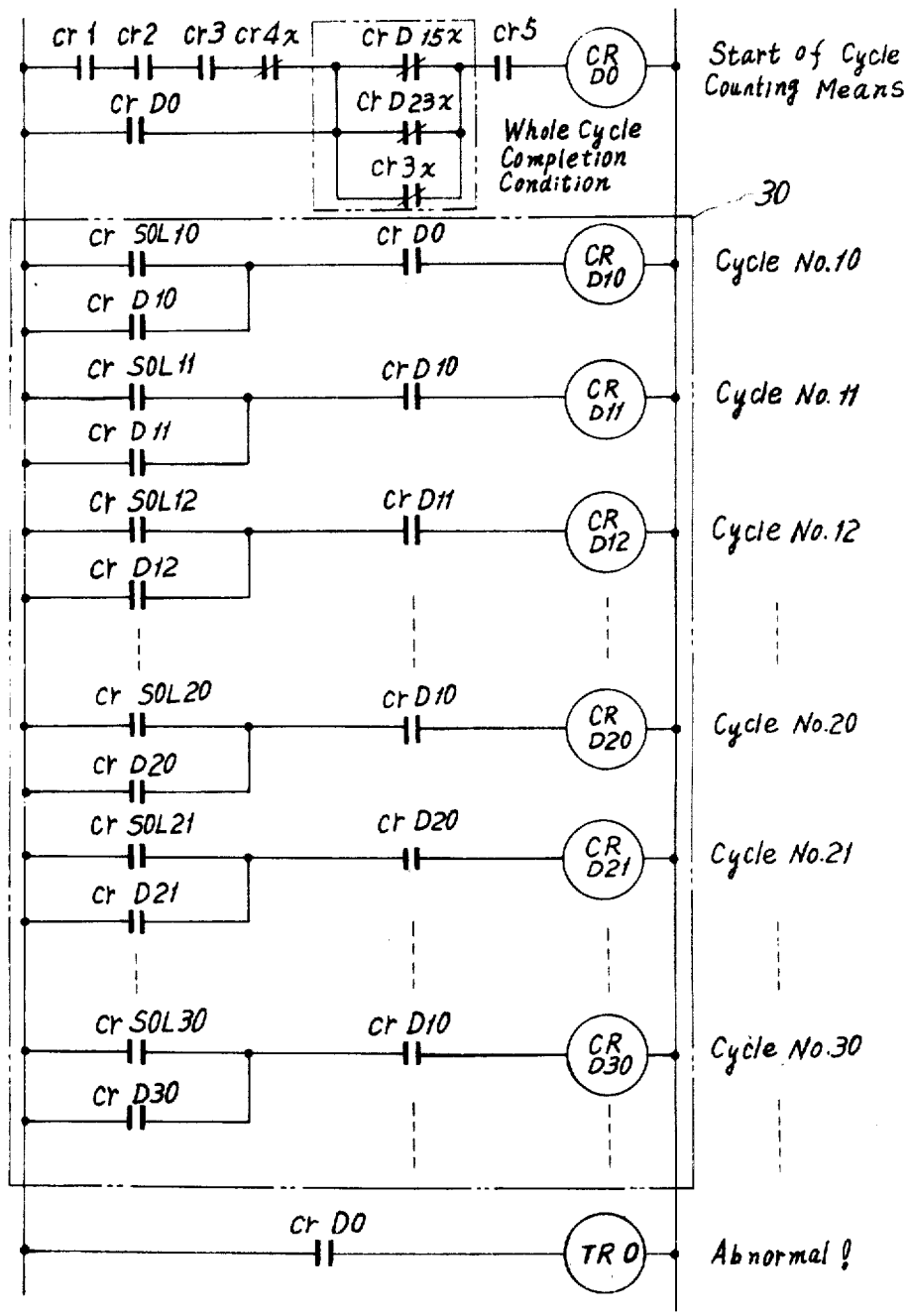
FIG. 3 shows a relay circuit representing a cycle counter and a trouble diagnosing timer.

FIG. 3 shows, for convenience, a conventional two line diagram illustrating a series of logical conditions in the form of a combination of contacts, and a plurality of relays which are respectively energized when the logical conditions are respectively satisfied. These relays CRD 0, CRD 10, CRD 11..., CRD 20, CRD 21. .., CRD 30, CRD 31, and a timer TR 0 are respectively provided in the sequence controller 10 as dummy elements on a dummy card and timer elements on a timer card. The logical condition is constructed so that the relay CRD 0 as a dummy factor can be set when all the essential conditions for a start of the sequence cycles become completed, and be reset when the complete sequence cycles are completed. The relays CRD 10, . . . CRD 15, CRD 20 . . . CRD 23, CRD 30 and CRD 31 constitute the cycle memorizing means 30 which memorizes the proceeding of the cycles shown, for example, in FIG. 4. In addition, it is to be noted that contacts cr1, cr2, cr3, cr5, representing a logical condition, are respectively closed when relays CR1, CR2, CR3 and CR5 (not shown) are energized, that is, when the continuous-drive command is applied from the sequence controller, when all controlled bodies are positioned at the respective original positions thereof, when a workpiece is transferred into the machine, and when the drive mode is switched from individual drives into a continuous drive; and that contacts cr4x, crD15x, crD23x, and cr3x are respectively opened when the relays CR4 (not shown), CRD15, CRD 23 and CR 3 (not shown) are de-energized. The cycles in FIG. 4 comprise series cycles and parallel cycles. The parallel cycles branch from a respective series cycle and then join at a joining point. The cycle memorizing means memorizes the performance of the cycles in each line or step in FIG. 4. Thus, the relays CRD 10 to CRD 15, relays CRD 20 to CRD 23 and relays CRD 30 and CRD 31 are respectively set at the starts of the cycles No. 10 to No. 15, cycles No. 20 to No. 23 and cycles No. 30 and No. 31 for the purpose of memorizing them. The timer TR 0 is controlled to be energized or de-energized by the contact of the relay CRD 0 which is set at the initiation of the first cycle No. 10 and reset at the completion of the complete cycles. This timer serves to form the detecting circuit for the trouble determined by the predetermined time interval being timed-out in the course of the cycles. When trouble in the machine is detected, the abnormal cycle is immediately found because the proceeding condition of the cycles is memorized in the cycle memorizing means 30, and the troubled cycle number is reported to the computer 20 for diagnosing the abnormal device and the cause of the trouble.

Figure 5:
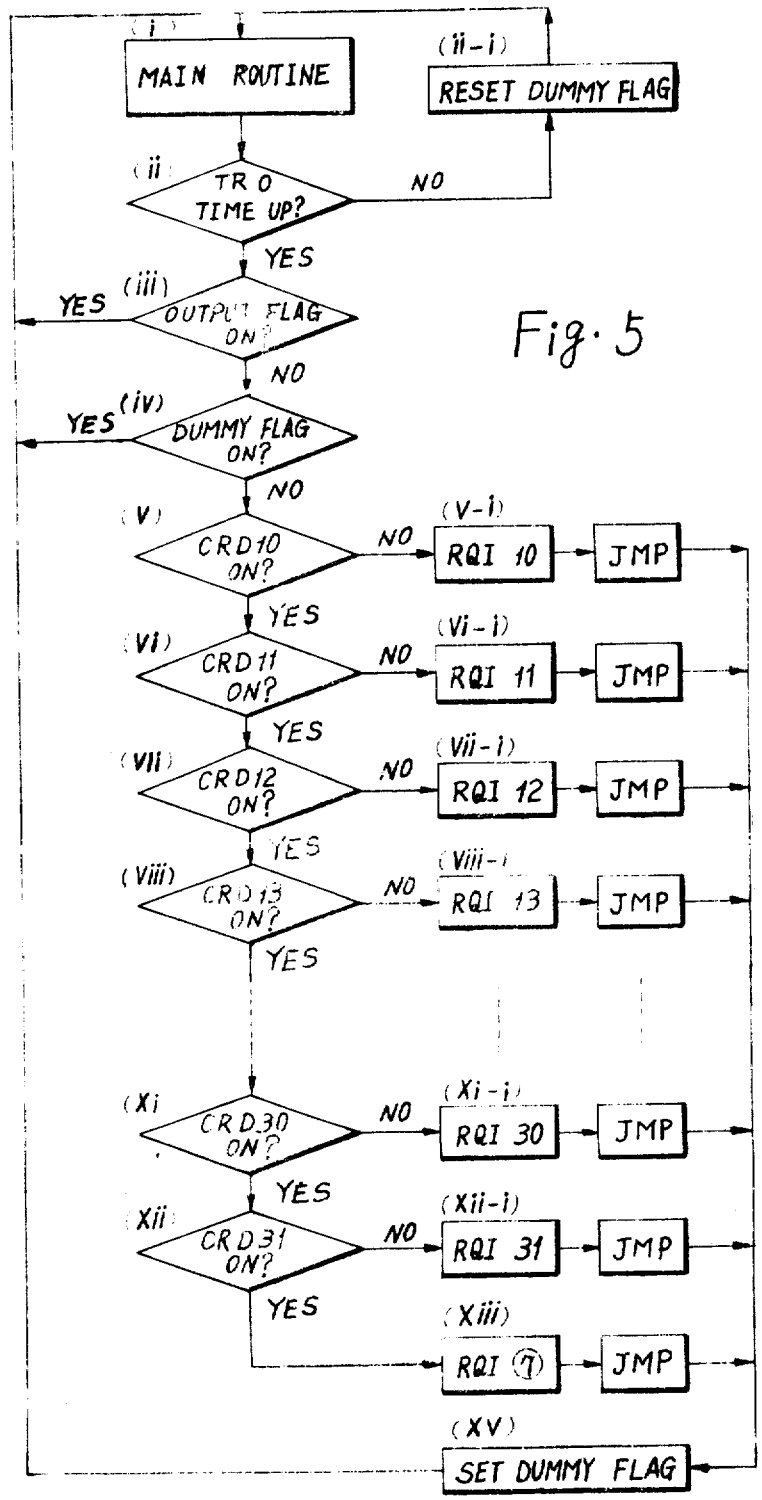
FIG. 5 shows a method for generating an abnormality signal from the sequence controller.

FIG. 5 shows a flow chart which indicates a process for detecting the troubled cycle number by the sequence controller 10 in accordance with the memory of the cycle memorizing means 30 and the time-out signal of the timer TR 0. The step (i) is a main routine for an execution of the programmed instructions for controlling sequential cycles of each machine such as, for example, the cycles shown in FIG. 4. In the step (ii), whether the timer TR 0 has timed-out or not is examined. If the answer is "NO," a predetermined dummy flag on the dummy card is set into a reset condition and the execution is returned to the main routine (i), because this indicates that the machine has been normally controlled. On the contrary, if the answer is "YES," it is apparent that a trouble has occured in the course of the machine cycles because the timer TR 0 has already timed-out before the completion of the complete machine cycles. Then, the step (iii) is executed at which time the condition of an output flag is tested. The output flag is set into a set or "ON" condition when the program interrupt toward the computer 20 is disabled and is set into a reset condition when the same is enabled. If the answer of the step (iii) is "YES," the loop of the steps (i), (ii), (iii) is repeated until the output flag is in a reset condition, that is, the program interrupt is enabled. When the step (iii) becomes "NO," the next step (iv) follows for testing whether or not the dummy flag is set into a set condition. The dummy flag serves to prevent a reporting of the interrupt request more than two one time times in one trouble to the computer 20. That is, the interrupt caused by the trouble is once requested, and the dummy flag is set in a set condition owning to the step (xv) for preventing a repeated or additional program interrupt. Accordingly, if the answer of the step (iv) is "YES," the processing cycle is returned to the main routine. When the answer of the step (iv) is "NO," the program interrupt by the trouble has not been reported to the computer 20 and therefore, the memory of the memorizing means 30 is tested by the steps (v) to (xii). More specifically, the set or reset conditions of the relays CRD 10 to CRD 15, CRD 20 to CRD 23, CRD 30 and CRD 31 as the dummy elements are examined in that order if the answer of the respective step is "YES." On the other hand, if the answer is "NO" in one step thereof, the relay corresponding to that step has not yet been energized. Thus, it is detected that the cycle corresponding to the de-energized relay is abnormal. Assuming that the result of the step (viii) is "NO," an interrupt request signal RQI 13 is generated in the step (viii-i) and thereafter the process jumps to step (xv) for setting the dummy flag into a set condition. Then, the process is returned to the step (i), i.e., the main routine. As was above described, once the interrupt request is applied to the computer 20, it is memorized by the setting of the dummy flag. Accordingly, when the execution is again repeated, the answer of the step is "YES," and the additional interrupt signal is never reported to the computer 20 since the next step is repeated by main routine (i). The steps (v) to (viii) are provided for determining the contents or memory of the cycle memorizing means, and the interrupt request signals RQI 10 to RQI 31 of the steps (v-i) to (xii-i) repectively correspond to respective cycles No 10 to No. 31. Each of them can be applied to the computer 20. The step (xiii) generates the interrupt request signal RQI 7 toward the computer 20 because there is some trouble in the last cycle since the cycle memory means 30 memorized the start of the last cycle and the timer TR 0 timed out. The dummy flag is necessarily set into a set condition in the step (xv) whenever the interrupt request signal is generated in any step and then the main routine is repeated. When the timer TR 0 is set into a reset condition by the later described recovery of the trouble, the step (ii) follows the step (ii-i), resulting in the resetting of the dummy flag. Thus, it is possible to perform the program interrupt in the next occurence of any trouble of the machine cycles.

Figure 6:
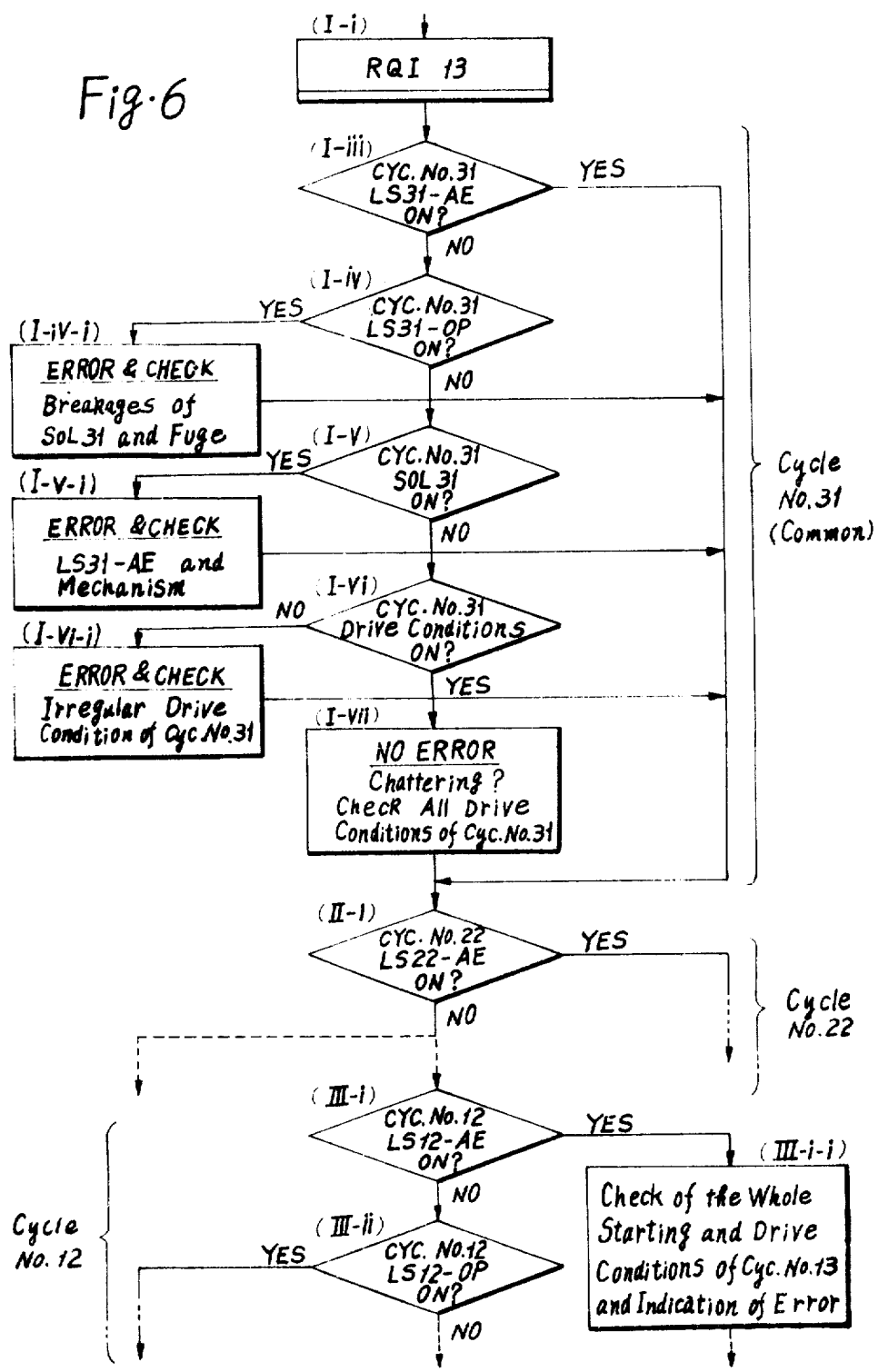
FIG. 6 shows a method for monitoring and diagnosing a trouble in the machine.

FIG. 6 partly shows a flow chart of the diagnosis programs memorized in the computer 20, and the diagnosing operation is explained when, for example, the interrupt request signal RQI 13 is applied to the computer 20 by the generation of the above trouble.

First of all, it is to be noted that it is desirable to use a common flow chart of programs shown in FIG. 6 for the diagnosis when each interrupt signal therefor is applied to the computer 20. For this purpose, the following method can be adopted, that is, the cycle numbers to be tested are respectively prepared in correspondence with the respective interrupt request signals for the diagnosis, and the input and output devices corresponding to the above cycle numbers are respectively selected. Thus, the lists of relationships between the interrupt request signal numbers and the cycle numbers to be tested and between the cycle numbers and the input and output devices to be tested corresponding thereto, such as the limit switches, solenoids, etc., are produced and memorized in the computer 20.

Of course, it is possible to respectively produce unique programs for each of the interrupt request signals RQI 10 to RQI 31, but this method is clearly diadvantageous compared with the foregoing list reference method.

When the interrupt request signal RQI 13 is applied in a step (I-i), the computer 20 is interrupted for diagnosing the trouble in the machine cycles by the execution of the following steps. In a step (I-iii), it is determined whether or not the movement of a controlled body in the cycle No. 31 was advanced to the advance end by a test of limit switch LS 31-AE for a confirmation thereof. If the answer is "YES," the cycle No. 31 is clearly completed without trouble. Then, the step (II-i) may be performed. When the determination in step (I-iii) is "NO," the next step (I-iv) follows, wherein it is determined whether or not a limit switch LS 31-OP for a confirmation of the original position of the body controlled in the cycle NO. 31 is closed, i.e., "ON," that is, whether or not the body is at the original position. When the test result is "YES," a solenoid SOL 31 for controlling the actuation of the cycle 31, a disconnection of a fuse, ect., are suspected to be the cause of the trouble and these items to be checked are displayed for reporting them to the operator. These control devices to be checked could be displayed on a paper by a teletype-writer, or on an indicator as the positions in the machine using the names of these control devices or intermittent lightings. In case the determination in the step (I-iv) is "NO," the next step (I-v) follows thereafter and it is determined whether or not the solenoid SOL 31 is energized, that is, "ON." When the result is "YES," the trouble of the limit switch LS 31-AE for a confirmation of the advance end or of the mechanism of the machine is suspected as being the cause, because the body controlled in the cycle No. 31 started from the original position thereof, but did not arrive at the advance end thereof. Thus, these items suspected to be the causes of the trouble are displayed in a similar manner as the foregoing. In case the determination is "NO," the following step (I-vi) is performed, wherein it is tested whether or not the drive conditions of the cycle No. 31 are satisfied. If some drive condition is not satisfied, the answer is "NO" and the adnormal drive condition is displayed. On the contrary, when the drive conditions are satisfied, the answer is "YES." In this case, it is understood that there is no trouble, but all drive conditions for the cycle No. 31 are thouroughly tested, because a chattering phenomenon and the like of the power switches might occur and result in a stoppage of the machine actuation during its operation, and thereafter the step (II-i) follows. As regards the cycle No. 22, tests similar to the foregoing steps (I-iii) to (I-vii) are performed for diagnosing the trouble in the cycle No. 22. Furthermore, the determinations similar to the foregoing are executed on the cycle No. 12. In a step (III-i), it is determined whether or not the limit switch LS12-AE for confirming the advance end of a body controlled in the cycle No. 12 is actuated. If the answer is "YES," it is understood that there is no trouble in the cycles previous to the cycle No. 13, and it can be suspected that there are troubles in starting conditions or drive conditions of the cycle No. 13. Thus, these conditions are examined and the items to be checked or the abnormal devices are displayed in the same manner.

As was above described, when the sequence controller 10 reports an occurence of trouble to the computer 20, the devices being troubled and the cause thereof can be diagnosed in accordance with the diagnosis programs, and can be instantaneously reported to the operator. Thus, the operator inspects the items indicated by the computer 20 for treating the cause and devices being troubled, and thereafter the controlled objects are returned to the respective original positions thereof by the individual drives so as to be able to start again. In this stage, the relay CRD 0 in FIG. 3 is set into a reset condition because the contact cr5 for an automatic and continuous drive is made open and therefore the timer TR 0 is de-energized. Accordingly, the trouble signal effected by the excessive time period is cleared. Then, the drive mode is switched to the automatic and continuous drive by the contact cr5 and when the start button is pushed, the automatic operations can be started again. Therefore, it is possible to substantially decrease the down-time required to repair the trouble.

In addition, it is to be noted that cycle memory devices of other than the relay type are able to be adopted for the cycle memorizing means 30.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Method for monitoring and diagnosing troubles in sequential control operations comprising the steps of:
   memorizing a predetermined machine sequence operation in a cycle memorizing means whenever each unit sequence cycle is performed, said machine sequence having at least one unit sequence cycle;
   determining whether or not said predetermined machine sequence operation has completed within a predetermined time;
   searching a progressing end of said unit sequence cycle when said predetermined machine sequence operation has not completed within said predetermined time, indicating an abnormality;
   generating an abnormality signal indicating said progressing end;
   executing diagnosis programs selected in response to said abnormality signal for diagnosing machine portions suspected to have been troubled and causes thereof.

2. Method for monitoring and diagnosing troubles in sequential control operations comprising the steps of:
   energizing a timer means simultaneously with a start of a predetermined machine sequence operation having at least one unit sequence cycle, a setting time of said timer means being longer by a predetermined short time than a nominal time needed to complete said predetermined machine sequence operation;
   memorizing each of said unit sequence cycles respectively in a cycle memorizing means in response to one of a start and a completion of said unit sequence cycle;
   de-energizing said timer means when said predetermined machine sequence operation has completed;
   determining a time-out of said timer means for testing whether or not said predetermined machine sequence operation has completed within said nominal time;
   searching a non-actuated cycle of said unit sequence cycles in accordance with a predetermined order when said timer means timed-out;
   generating an abnormality signal indicating a cycle number of said non-actuated cycle;
   executing diagnosis programs selected in accordance with said abnormality signal for diagnosing machine portions suspected to have been troubled and causes thereof; and
   indicating said portions troubled and causes thereof.

3. An apparatus for monitoring and diagnosing troubles in sequential control operations comprising;
   cycle memorizing means respectively memorizing a performance of each unit sequence cycle of a predetermined machine sequence operation;
   determination means for determinng whether or not said predetermined machine sequence operation has completed within a predetermined time;
   signal generating means for searching a non-actuation cycle of said unit sequence cycle when said predetermined machine sequence operation has not completed within said predetermined time and for generating an abnormality signal indicating a number corresponding to said non-actuated cycle;
   means for diagnosing at least one portion of portions suspected to have been troubled and causes thereof in accordance with said abnormality signal; and
   indication means for displaying at least one of said portions suspected to have been troubled and said causes thereof.

4. An apparatus for monitoring and diagnosing troubles in sequential control operations comprising;
   cycle memorizing means for respectively memorizing a performance of each unit sequence cycles of a predetermined machine sequence operation;
   timer means being energized simultaneously with a start of a predetermined machine sequence operation and de-energized by a completion of the same, a setting time of said timer being slightly longer than a nominal time required to complete said predetermined machine sequence operation and a time-out signal of said timer means indicating an occurrence of an abnormality;
   first control means for searching a non-actuated cycle of said unit sequence cycles in accordance with a predetermined order when said timer means timed-out, and generating an abnormality signal suggesting a cycle number of said non-actuated cycle;
   second control means for executing diagnosing programs selected in accordance with said abnormality signal for diagnosing at least one of causes and portions supposed to have been troubled; and
   indicating means for displaying at least one of said causes and portions suspected to have been troubled.

5. An apparatus according to claim 4, further comprising means for prohibiting an additional generation of said abnormality signal when the same is once generated in one time-out of said timer means.

6. An apparatus according to claim 4, wherein said cycle memorizing means comprises a plurality of relays respectively memorizing a performance of each unit sequence cycle.

* * * * *